July 24, 1934.  G. SLAYTER  1,967,375
POROUS REFRACTORY MATERIAL AND METHOD OF MAKING SAME
Filed June 15, 1932
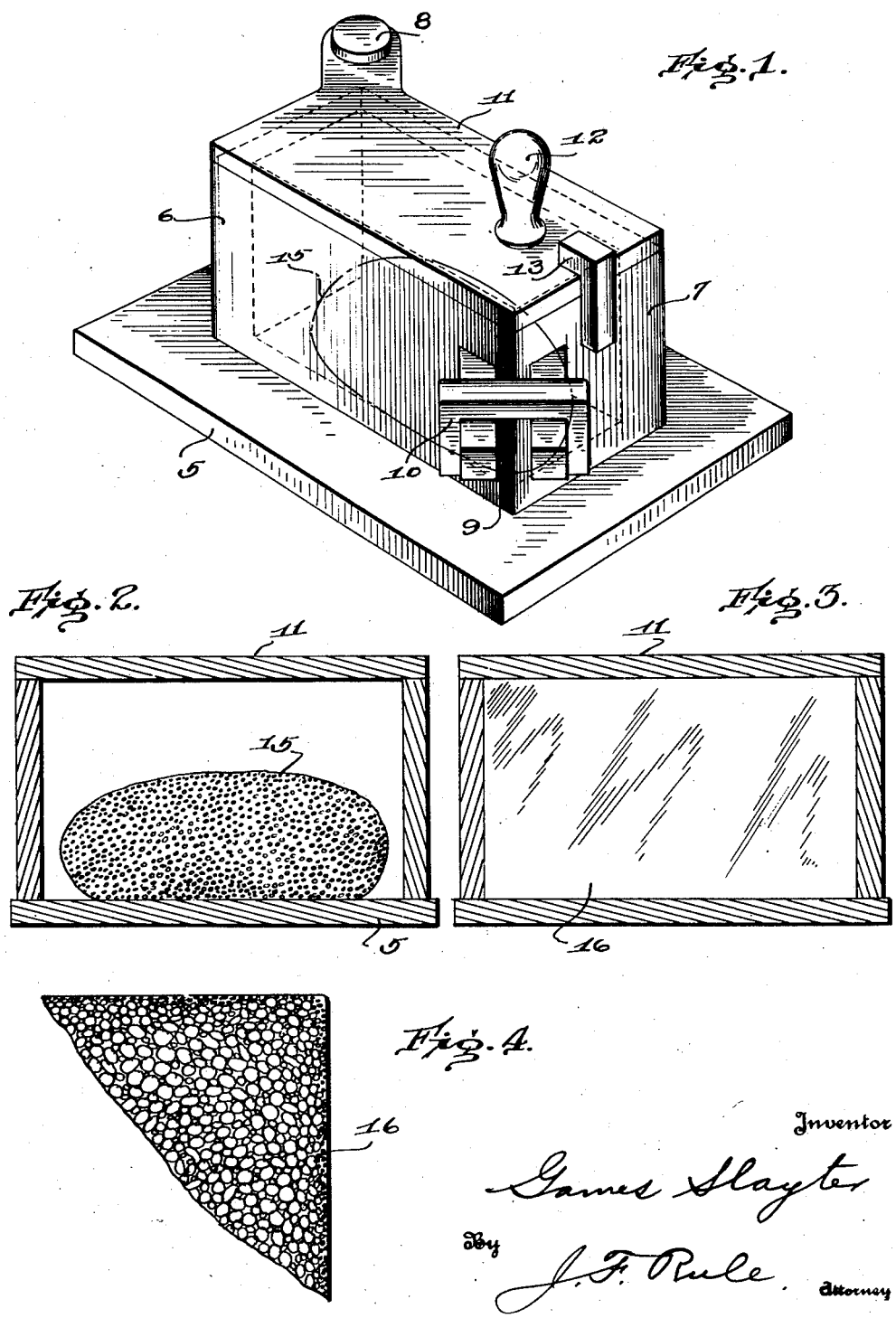

Patented July 24, 1934

1,967,375

UNITED STATES PATENT OFFICE 1,967,375

POROUS REFRACTORY MATERIAL AND METHOD OF MAKING SAME

Games Slayter, Detroit, Mich., assignor to Owens-Illinois Glass Company, a corporation of Ohio Application June 15, 1932, Serial No. 617,448

14 Claims. (Cl. 49—77)

My invention relates to a light, porous, refractory substance made of glass or other refractory material having minute pockets or bubbles containing air or other gas intermixed with said material and permeating the mass.

In my copending application Serial Number 617,449, filed June 15, 1932, I have disclosed a method of making such a material by expanding a mass of molten glass or the like in a mold by the expansive action of air or other gases which permeate the mass. The present invention relates, more particularly, to a novel method of obtaining a substantially uniform size and distribution of the gas pockets or spaces throughout the mass.

I have found that glass and other refractory materials, when in a molten state, ordinarily contain considerable amounts of air and other gases in solution. If a mass of molten glass is placed within a vacuum chamber and the air surrounding the mass exhausted, the dissolved gases within the mass are drawn out of solution and expand the glass, thereby producing a light, porous structure. There is, however, a great lack of uniformity in the size and arrangement of the pockets or spaces within the mass, so that the structure as a whole is by no means uniform in texture.

An object of the present invention is to produce by a novel method, a refractory, porous material of the character above indicated, but in which there is a substantially uniform size and distribution of the air or gas pockets which permeate the mass.

In practicing my invention, the glass or other refractory material is melted in the usual or any approved manner. While the glass is in a molten or plastic condition, a highly refractory material which will withstand the high temperature of the molten mass at least temporarily, is introduced in powdered form into the molten mass and intimately mixed therewith. I have found that finely powdered silicon carbide, for example, is well adapted for the purpose. The silicon carbide, or carborundum in powdered form, is stirred into a mass of the molten material, so that the individual particles of the carborundum are distributed as uniformly as possible through the mass. These particles appear to act as points of departure for the gas that is held in solution in the molten mass. The mass is then introduced into a mold and the air which fills the surrounding space in the mold is withdrawn from the mold so that the gases within the mass expand it and cause it to fill the mold. Each particle of the powdered silicon carbide serves as a nucleus and point of departure for the gas held in solution so that the gas is drawn out of solution. In this manner, there is produced a mass of light, porous, refractory material in which the air spaces or pockets are of approximately uniform size and even distribution. After expansion of the mass in the mold, it is permitted to cool and harden before the vacuum is released, so that it can withstand atmospheric pressure. It is then removed from the mold and annealed in a leer. The amount of powdered material used may vary, a small amount, usually a fraction of one percent, being sufficient to give satisfactory results.

In the accompanying drawing which illustrates an apparatus for use in practicing my invention:

Fig. 1 is a perspective view of a mold.

Fig. 2 is a longitudinal sectional elevation of the same, showing a mass of molten material within the mold prior to expansion.

Fig. 3 is a view similar to Fig. 2, but showing the mass after expansion within the mold.

Fig. 4 is a fragmentary view on a larger scale, of the block of expanded material.

The mold comprises a base plate 5 and a body portion including mold halves 6 and 7 mounted to swing horizontally to and from each other about a vertical hinge pin 8 rising from the base 5. When the mold is closed, the mold halves 6 and 7 meet in a vertical line 9. The mold halves are locked in closed position by a clamp 10. The mold comprises a cover plate 11 mounted on the hinge pin 8 to swing horizontally and is operable by a handle 12. The cover when swung into closed position engages beneath and is held down by a clamp 13.

In practicing the invention, a mass 15 of glass or the like with which a refractory powdered material such as powdered carborundum has been mixed, is placed within the mold. The mold is then closed and introduced into a vacuum chamber (not shown) and the air immediately withdrawn from the chamber. The air within the mold is thus withdrawn, escaping between the cracks or crevices at the meeting faces of the mold sections. When the mold is thus vacuumized, the mass 15 immediately expands and fills the mold, owing to the internal pressure within the mass generated by the air or other gases therein. There is thus formed a block 16 of porous, refractory material. When this block has cooled and hardened, the mold is opened and the block removed. It may then be placed in an annealing leer and annealed.

The block thus produced has a light, porous or foamy structure which is substantially uniform throughout, except that the surface portions thereof are more dense and form a hard, smooth surface or crust enveloping the lighter more foamy material forming the body of the block. The formation of this comparatively dense surface layer is apparently due mainly to the skin or enamel of comparatively cold glass which forms on the mass 15 before it is expanded in the mold.

In carrying out the above described method, the refractory powdered material is introduced into the molten mass as short a time as practical before the latter is expanded, to prevent oxidation or destruction of such material before it can function in the manner above pointed out. It is found that it is much more effective when introduced after the glass is melted than if mixed with a raw batch from which the glass is produced.

Modifications may be resorted to within the spirit and scope of my invention.

What I claim is:

1. The method which comprises producing a molten mass of vitreous material, permeating the mass with a highly refractory material in powdered form, removing the surrounding air pressure from the mass, causing the latter to be expanded to an increased bulk by the expansive action of the gases which permeate the mass, and then cooling and hardening the mass.

2. The method which comprises mixing silicon carbide in powdered form with a mass of molten glass, causing the individual particles of the carbide to act as points of departure for the gas held in solution within the glass, causing said gas to expand and thereby form gas pockets distributed throughout the mass, and cooling and solidifying the mass.

3. The method which comprises mixing silicon carbide in powdered form with a mass of molten glass, causing the individual particles of the carbide to act as points of departure for the gas held in solution within the glass, causing said gas to expand and thereby form gas pockets distributed throughout the mass and simultaneously expand the mass within a mold, thereby molding the mass, and cooling and solidifying the molded mass.

4. The method which comprises mixing silicon carbide in powdered form with a mass of molten glass, causing the individual particles of the carbide to act as points of departure for the gas held in solution within the glass, introducing the mass into a mold, withdrawing the surrounding air from the mass and thereby causing the said gas to form gas pockets distributed throughout the mass and to expand the mass and fill the mold, and cooling and solidifying the mass.

5. The method of producing a mass of foamy, vitreous material which comprises introducing into a molten mass of the material a foreign refractory material in a finely divided state, causing the particles of said foreign material to act as points of departure for the gas held in solution in the mass, and causing said gas to expand and thereby expand the mass.

6. The method of producing a mass of foamy, vitreous material which comprises introducing into a molten mass of the material a foreign refractory material in a finely divided state, and removing the external air pressure from the mass while in a molten or plastic state and causing the mass to be expanded by the internal pressure of gases distributed throughout the mass.

7. The method of producing a mass of foamy, refractory material which comprises introducing into a molten mass of the material a foreign refractory material in a finely divided state, and causing the mass to be expanded by internal pneumatic pressure applied at a multiplicity of points distributed throughout the interior of the mass.

8. A material comprising a vitreous body having a porous structure, and powdered silicon carbide intermixed therewith.

9. A mass of refractory material including a body of vitreous material having a cellular structure, and a minutely divided material more highly refractory than said vitreous material within the cell walls of said structure.

10. A mass of refractory material including a body of vitreous material having a cellular structure, and a minutely divided material more highly refractory than said vitreous material within the cell walls of said structure, said more highly refractory material comprising only a small fraction of the mass.

11. An insulating material comprising a body of vitreous material, and a comparatively small amount of silicon carbide intermixed therewith.

12. A refractory porous material having a cellular structure comprising gas pockets or cells permeating the structure, and particles of silicon carbide within the walls of said cells.

13. A refractory porous material having a cellular structure comprising gas pockets or cells permeating the structure, and particles of silicon carbide within said cells, said cells containing rarefied gas.

14. A molded block of vitreous material having a multiplicity of minute pockets or cells permeating the mass, and silicon carbide in a finely divided state distributed throughout the mass.

GAMES SLAYTER.